(12) United States Patent
Pinarbasi (10) Patent No.: US 6,208,492 B1
(45) Date of Patent: Mar. 27, 2001

(54) SEED LAYER STRUCTURE FOR SPIN VALVE SENSOR

(75) Inventor: Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/311,217

(22) Filed: May 13, 1999

(51) Int. Cl.$^7$ .................................................. G11B 5/39
(52) U.S. Cl. ............................................... 360/324.11
(58) Field of Search ........................... 360/324.1, 324.11, 360/324.12

(56) References Cited

U.S. PATENT DOCUMENTS

| | | | |
|---|---|---|---|
| 5,696,656 | * 12/1997 | Gill et al. | 360/113 |
| 5,764,056 | * 6/1998 | Mao et al. | 324/252 |
| 5,768,071 | * 6/1998 | Lin | 360/113 |
| 5,774,394 | * 6/1998 | Chen et al. | 365/158 |
| 5,828,529 | * 10/1998 | Gill | 360/113 |
| 5,903,415 | * 5/1999 | Gill | 360/113 |
| 5,920,446 | * 7/1999 | Gill | 360/113 |
| 5,993,566 | * 11/1999 | Lin | 148/108 |
| 6,052,262 | * 4/2000 | Kamiguchi et al. | 360/113 |

* cited by examiner

Primary Examiner—William Klimowicz
(74) Attorney, Agent, or Firm—Gray Cary Ware & Freidenrich LLP; Ervin F. Johnston (57) ABSTRACT

A bilayer seed layer structure is employed between a first read gap layer and a spin valve sensor for increasing the magnetoresistive coefficient (dr/R). In a bottom spin valve sensor the bilayer seed layer structure is located between the first read gap layer and a pinning layer and in a top spin valve sensor the bilayer seed layer structure is located between the first read gap layer and the free layer. The pinning layer is preferably iridium manganese (IrMn). The bilayer seed layer structure includes a first seed layer which is a metallic oxide and a second seed layer that is a nonmagnetic metal. A preferred embodiment is a first seed layer of nickel manganese oxide (NiMnO) and a second seed layer of copper (Cu).

45 Claims, 9 Drawing Sheets

FIG. 11
(ABS)

SEED LAYER STRUCTURE FOR SPIN VALVE SENSOR

BACKGROUND OF THE INVENTION

1. Field of the Invention

The present invention relates to a seed layer structure for a spin valve sensor and, more particularly, to a bilayer seed layer structure which increases a magnetoresistive coefficient of the spin valve sensor by improving its microstructure.

2. Description of the Related Art

The heart of a computer is an assembly that is referred to as a magnetic disk drive. The magnetic disk drive includes a rotating magnetic disk, a slider that has write and read heads, a suspension arm that supports the slider above the rotating disk and an actuator that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic impressions from the rotating disk. The read and write heads are connected to processing circuitry that operates according to a computer program to implement the writing and reading functions.

The read head includes a sensor that is located between nonmagnetic electrically insulative first and second read gap layers and the first and second read gap layers are located between ferromagnetic first and second shield layers. The write head includes a coil layer embedded in first, second and third insulation layers (insulation stack), the insulation stack being sandwiched between first and second pole piece layers. A gap is formed between the first and second pole piece layers by a nonmagnetic gap layer at an air bearing surface (ABS) of the write head. The pole piece layers are connected at a back gap. Current conducted to the coil layer induces a magnetic field into the pole pieces that fringes across the gap between the pole pieces at the ABS. The fringe field or the lack thereof writes information in tracks on moving media, such as in circular tracks on a rotating disk.

In recent read heads a spin valve sensor is employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer, and a free layer. First and second leads are connected to the spin valve sensor for conducting a sense current therethrough. The magnetization of the pinned layer is pinned perpendicular to an air bearing surface (ABS) of the head and the magnetic moment of the free layer is located parallel to the ABS but free to rotate in response to external magnetic fields. The magnetization of the pinned layer is typically pinned by exchange coupling with an antiferromagnetic layer.

The thickness of the spacer layer is chosen so that shunting of the sense current and a magnetic coupling between the free and pinned layers are minimized. This thickness is less than the mean free path of conduction electrons through the sensor. With this arrangement, a portion of the conduction electrons is scattered by the interfaces of the spacer layer with the pinned and free layers. When the magnetizations of the pinned and free layers are parallel with respect to one another, scattering is minimal and when the magnetizations of the pinned and free layers are antiparallel, scattering is maximized. Changes in scattering alter the resistance of the spin valve sensor in proportion to $\cos\theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor resistance changes cause potential changes that are detected and processed as playback signals by the processing circuitry.

The spin valve sensor is characterized by a magnetoresistive (MR) coefficient that is substantially higher than the MR coefficient of an anisotropic magnetoresistive (AMR) sensor. MR coefficient is dr/R were dr is the change in resistance of the spin valve sensor and R is the resistance of the spin valve sensor before the change. A spin valve sensor is sometimes referred to as a giant magnetoresistive (GMR) sensor. When a spin valve sensor employs a single pinned layer it is referred to as a simple spin valve.

Another type of spin valve sensor is an antiparallel (AP) spin valve sensor. The AP pinned spin valve sensor differs from the simple spin valve sensor in that an AP pinned structure has multiple thin film layers instead of a single pinned layer. The AP pinned structure has an AP coupling layer sandwiched between first and second ferromagnetic pinned layers. The first pinned layer has its magnetic moment oriented in a first direction by exchange coupling to the antiferromagnetic pinning layer. The second pinned layer is immediately adjacent to the free layer and is antiparallel exchange coupled to the first pinned layer because of the minimal thickness (in the order of 8 Å) of the AP coupling film between the first and second pinned layers. Accordingly, the magnetic moment of the second pinned layer is oriented in a second direction that is antiparallel to the direction of the magnetic moment of the first pinned layer.

The AP pinned structure is preferred over the single pinned layer because the magnetic moments of the first and second pinned layers of the AP pinned structure subtractively combine to provide a net magnetic moment that is less than the magnetic moment of the single pinned layer. The direction of the net moment is determined by the thicker of the first and second pinned layers. A reduced net magnetic moment equates to a reduced demagnetization (demag) field from the AP pinned structure. Since the antiferromagnetic exchange coupling is inversely proportional to the net pinning moment, this increases exchange coupling between the first pinned layer and the pinning layer. The AP pinned spin valve sensor is described in commonly assigned U.S. Pat. No. 5,465,185 to Heim and Parkin which is incorporated by reference herein.

In a bottom spin valve sensor the pinning layer is located at the bottom of the spin valve sensor. Layers of the spin valve sensor constructed on the pinning layer include a pinned layer structure which has its magnetic moment pinned by the pinning layer, the spacer layer and a free layer that has a magnetic moment that is free to rotate in response to a signal field. A typical material employed for the pinning layer in a bottom spin valve is nickel oxide (NiO). Another material in a first class of materials is alpha ferric oxide ($\alpha$ $Fe_2O_3$).

A second class of materials, which may be employed for a pinning layer in a bottom spin valve, includes iridium manganese (IrMn), nickel manganese (NiMn), platinum manganese (PtMn) and iron manganese (FeMn) which are metals. An advantage of the second class of materials is that the pinning layer can be made thinner. A typical thickness of a nickel oxide (NiO) pinning layer, in the first class of materials, is 425 Å while a typical thickness of an iridium manganese (IrMn) pinning layer, in the second class of materials, is 80 Å. This is a difference of 345 Å. Since it is desirable to keep the read gap (distance between the first and second shield layers) as thin as possible for promoting linear density of the head, iridium manganese (IrMn) is very desirable for use as a pinning layer. One of the disadvantages of the second class of materials, however, is that a read head employing a bottom pinning layer made of one of the second class of materials has a lower magnetoresistive coefficient (dr/R) than a read head having a pinning layer made from one of the first class of materials. For instance, in an antiparallel pinned spin valve sensor that employs a pinning layer made of nickel oxide (NiO), the magnetoresistive coefficient is approximately 7%, whereas an antiparallel pinned spin valve sensor employing a pinning layer made from iridium manganese (IrMn) has a magnetoresistive coefficient (dr/R) of approximately 4.5%. In both instances the pinning layer interfaced an aluminum oxide ($Al_2O_3$) first read gap layer. In a simple spin valve sensor, when a single iridium manganese (IrMn) pinning layer was directly on an aluminum oxide ($Al_2O_3$) first read gap layer, the magnetoresistive coefficient (dr/R) was approximately 4.0%. While iridium manganese (IrMn) has the advantage of less thickness than the first class of materials, it has a significant disadvantage in the loss of magnetoresistive coefficient (dr/R) when employed as a pinning layer. When the magnetoresistive coefficient (dr/R) is low the strength of the read signal is low, which equates to decreased storage capacity of a magnetic disk drive.

SUMMARY OF THE INVENTION

I found by employing a bilayer seed layer structure between an iridium manganese (IrMn) pinning layer and an aluminum oxide ($Al_2O_3$) first read gap layer that the magnetoresistive coefficient (dr/R) in an antiparallel pinned bottom spin valve sensor is 8.24% as compared to the aforementioned 4.5% when the bilayer seed layer structure is omitted. The bilayer seed layer structure includes a first seed layer made of a metallic oxide and a second seed layer made of metal. The first seed layer interfaces the aluminum oxide ($Al_2O_3$) first read gap layer and the second seed layer is located between the first seed layer and the pinning layer. Metallic oxides can be nickel manganese oxide (NiMnO), nickel oxide (NiO) or nickel iron chromium oxide (NiFeCrO) with the preferred metallic oxide being nickel manganese oxide (NiMnO). The metal layer may be copper (Cu), aluminum copper (AlCu), ruthenium (Ru), aluminum (Al), rhodium (Rh), gold (Au) or an alloy of gold, such as gold copper (AuCu), with a preferred material for the second seed layer being copper (Cu). The bilayer seed layer may be employed in either an antiparallel pinned spin valve structure or a simple spin valve structure.

An object of the present invention is to improve the magnetoresistive coefficient (dr/R) of a spin valve sensor when the pinning layer is made from a class of materials including iridium manganese (IrMn), nickel manganese (NiMn) and platinum manganese (PtMn).

Another object is to provide a read head with a spin valve sensor that has an improved read gap, improved thermal stability and an improved magnetoresistive coefficient (dr/R).

A further object is to provide a seed layer structure for an iridium manganese (IrMn) pinning layer that improves the magnetoresistive coefficient of a spin valve sensor.

Other objects and advantages of the invention will become apparent upon reading the following description taken together with the accompanying drawings.

DESCRIPTION OF THE PREFERRED EMBODIMENTS

Magnetic Disk Drive

Figure 1:
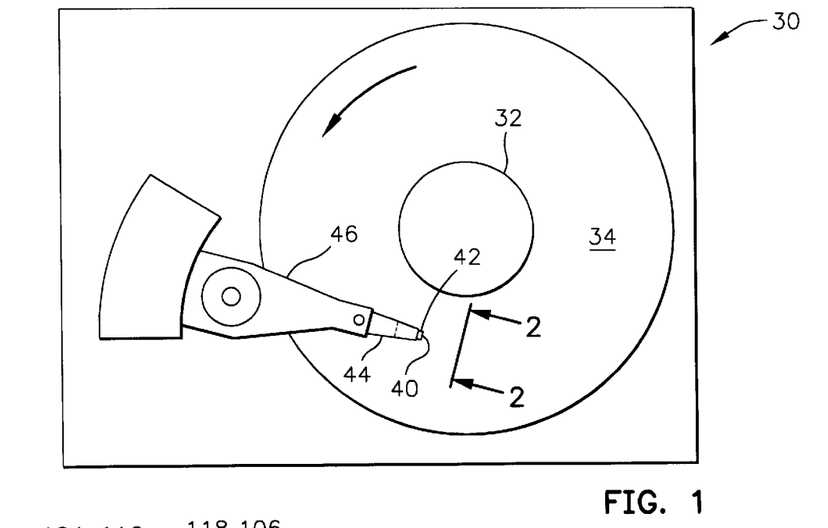
FIG. 1 is a plan view of an exemplary magnetic disk drive.
Figure 2:
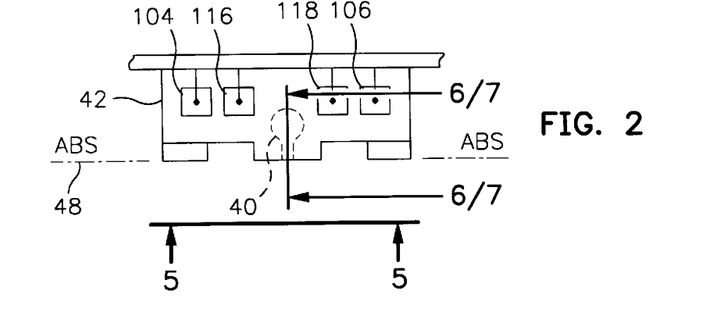
FIG. 2 is an end view of a slider with a magnetic head of the disk drive as seen in plane 2—2.
Figure 3:
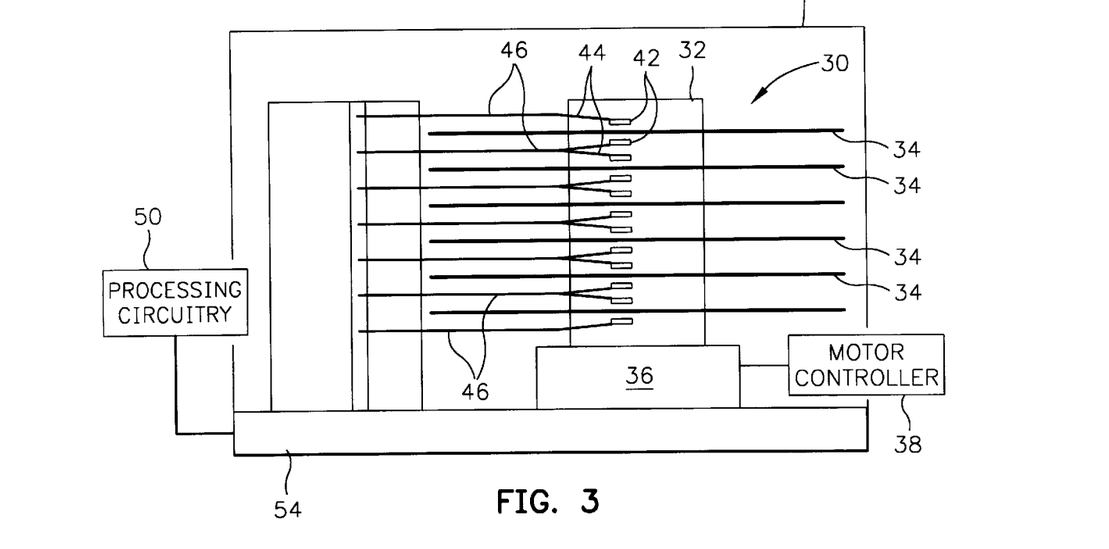
FIG. 3 is an elevation view of the magnetic disk drive wherein multiple disks and magnetic heads are employed.
Figure 4:
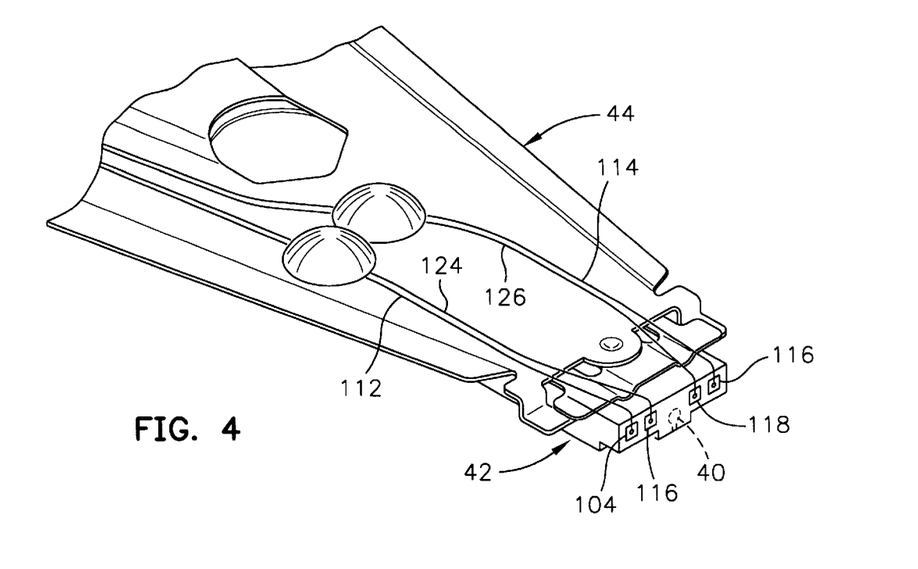
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A slider 42 with a combined read and write magnetic head 40 is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a suspension 44. The components described hereinabove may be mounted on a frame 54 of a housing, as shown in FIG. 3.

Figure 5:
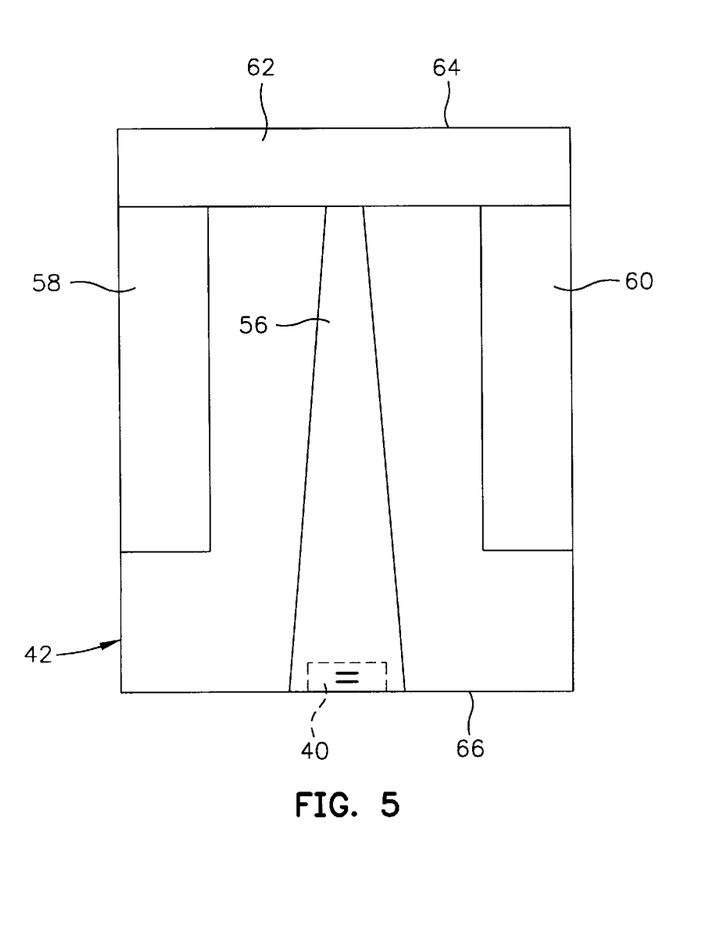
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
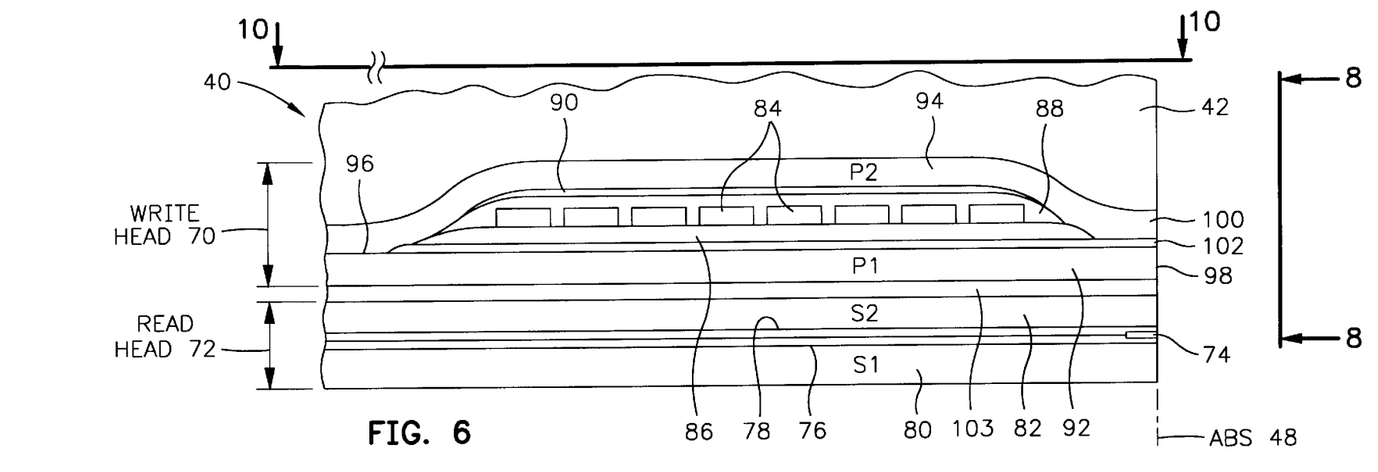
FIG. 6 is a partial view of the slider and a piggyback magnetic head as seen in plane 6—6 of FIG. 2.
Figure 8:
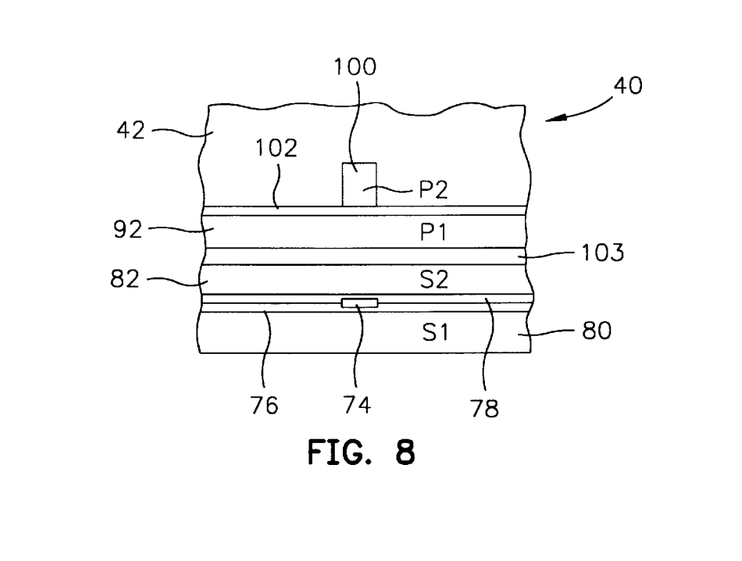
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 7:
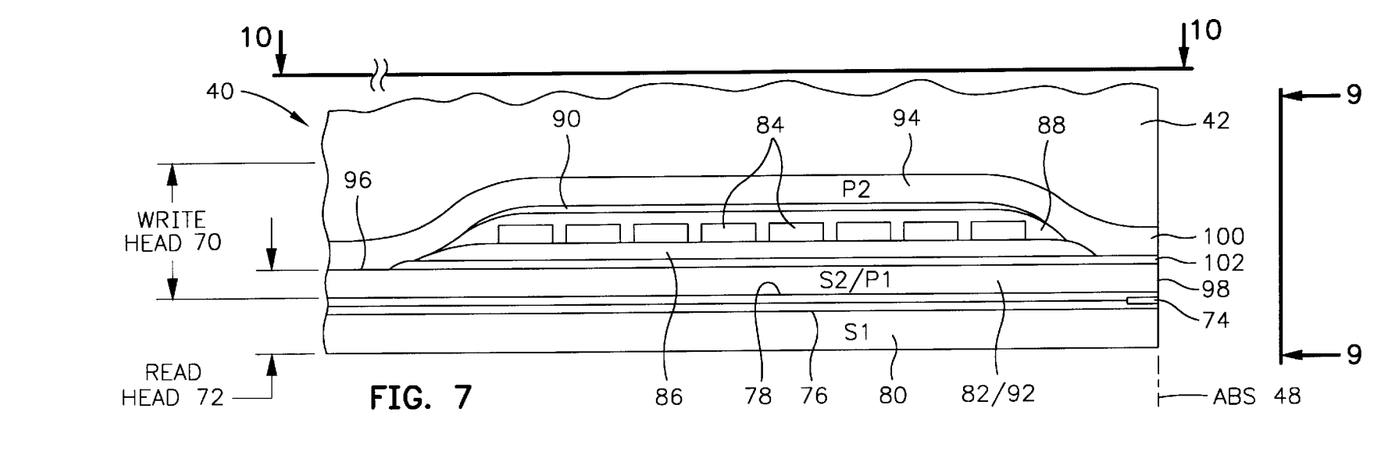
FIG. 7 is a partial view of the slider and a merged magnetic head as seen in plane 7—7 of FIG. 2.
Figure 9:
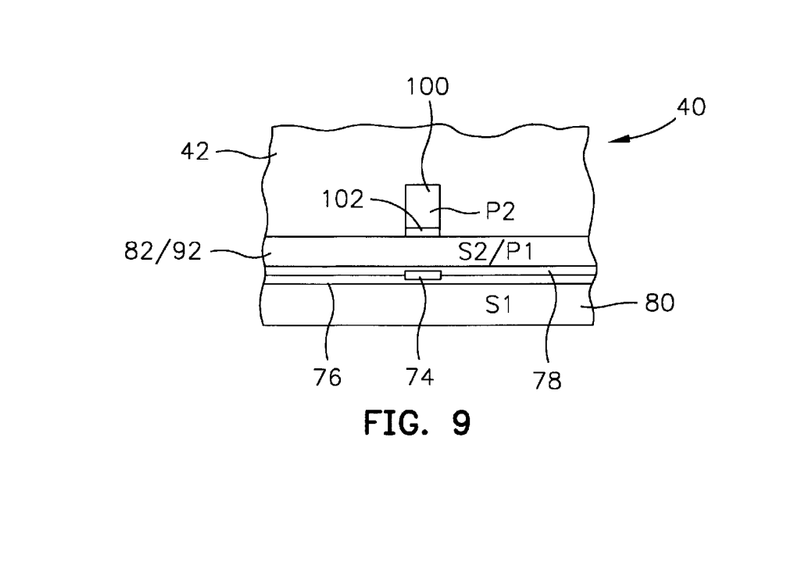
FIG. 9 is a partial ABS view of the slider taken along plane 9—9 of FIG. 7 to show the read and write elements of the merged magnetic head.
Figure 10:
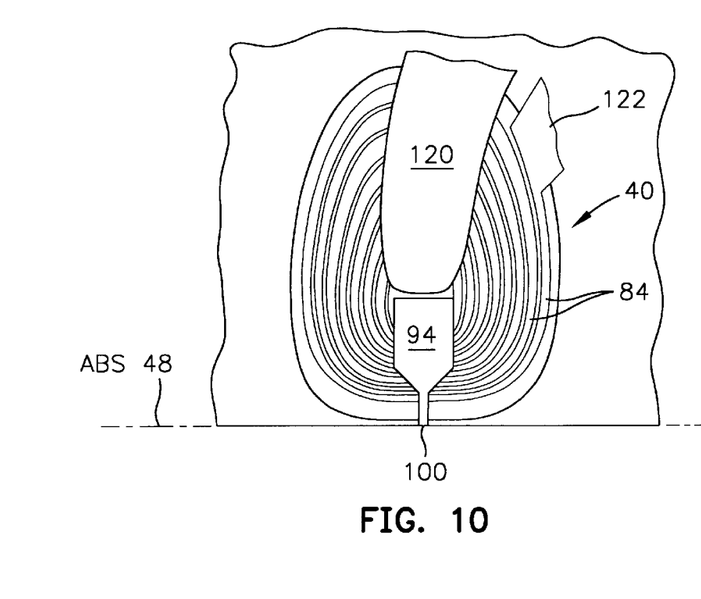
FIG. 10 is a view taken along plane 10—10 of FIGS. 6 or 7 with all material above the coil layer and leads removed.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
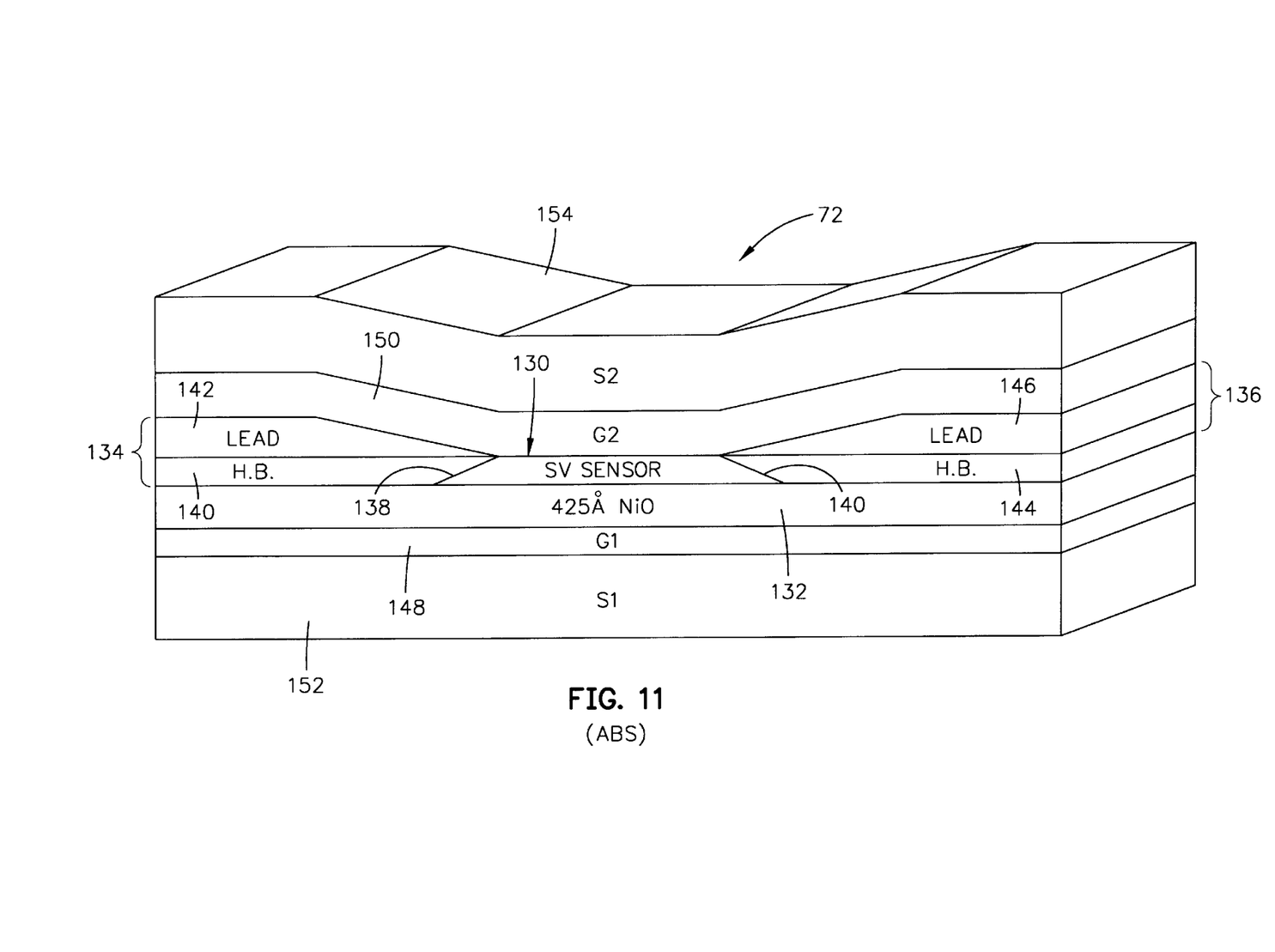
FIG. 11 is an isometric ABS illustration of a read head which employs an AP pinned spin valve (SV) sensor.

FIG. 11 is an isometric ABS illustration of the read head 72 shown in FIGS. 6 or 8. The read head 72 includes the present spin valve sensor 130 which is located on an antiferromagnetic (AFM) pinning layer 132. A ferromagnetic pinned layer in the spin valve sensor 130, which is to be described hereinafter, has a magnetic moment that is pinned by the magnetic spins of the pinning layer 132. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing magnetic domains of a ferromagnetic free layer therein. The AFM pinning layer 132, the spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154. The present invention provides a seed layer structure below the spin valve sensor for improving its magnetoresistive coefficient (dr/R).

In the following four examples various layers underlying a spin valve sensor and layers of the spin valve sensor were ion beam sputter deposited in a sputtering chamber. Various targets were sputtered by xenon (Xe) ions in a low pressure xenon (Xe) atmosphere emanating from an ion beam gun. Sputtered material from the target was deposited on a substrate to form the layers. After completion of the spin valve sensor the spin valve sensor was reset at a predetermined temperature in the presence of a field for a predetermined period of time. For the antiparallel pinned spin valve sensors in Examples 1 and 2, the temperature was 230° C. in the presence of a field of 10,000 Oe for 10 minutes. For a simple spin valve sensor in Examples 3–6, the resetting was done at a temperature of 230° C. in the presence of a field of 500 Oe for a period of 2 hours. In each of the examples the magnetoresistive coefficient (dr/R) was measured as well as the ferromagnetic coupling field ($H_F$). The change in magnetoresistance (dr) is the difference between magnetoresistance when the magnetic moments of the pinned and free layers are parallel and the magnetoresistance of the spin valve sensor when the magnetic moments of the pinned and free layers are antiparallel. This value is divided by the resistance (R) of the spin valve sensor when the magnetic moments of the pinned and free layers are parallel. The aforementioned ferromagnetic coupling field ($H_F$) is the field exerted on the free layer by the pinned layer due to the magnetic moment of the pinned layer. This field should be kept relatively low, such as 10 Oe, since it affects the bias point of the sensor, where the bias point is the point on a transfer curve of the spin valve sensor with a sense current $I_S$ is conducted through the sensor without any signal field. The bias point should be located midway on the transfer curve and, if it is offset from the midway position, the read sensor has read signal asymmetry. Read signal asymmetry equates to a decreased read signal and a lower storage capability. The transfer curve is a plot of the change in magnetoresistance (dr) versus a change in the applied field.

Example 1

Figure 12:
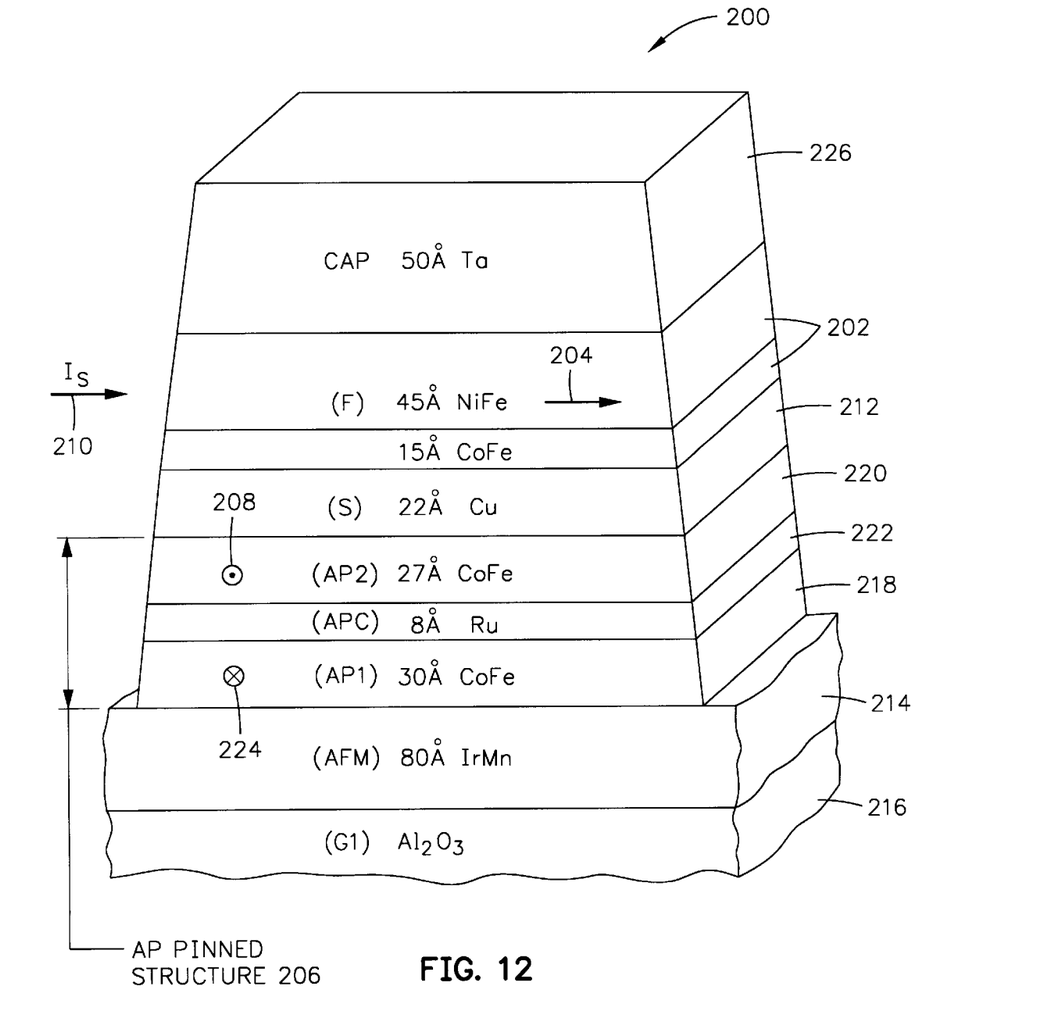
FIG. 12 is an ABS illustration of a first example of a spin valve investigated by me wherein the pinned layer structure interfaces the pinning layer.

A first example of an antiparallel (AP) pinned spin valve sensor 200 is shown in FIG. 12. The spin valve sensor 200 includes a ferromagnetic free layer 202 that has a magnetic moment 204 that is free to rotate from a first direction in response to a signal field from a track of a rotating magnetic disk. The magnetic moment 204 is typically oriented parallel to the ABS, as shown at 204 in FIG. 12. The spin valve sensor also includes a ferromagnetic pinned layer structure 206 which has a magnetic moment 208 oriented in a second direction. The second direction is typically perpendicular to the ABS and may be directed away from or toward the ABS. The magnetic moment 208 is pinned and is not free to rotate while the magnetic moment 204 freely rotates in response to signal fields from the rotating magnetic disk. When the magnetic moment 204 is rotated upwardly into the paper by a signal field the magnetic moments 204 and 208 become more antiparallel which increases the resistance of the spin valve sensor. When the magnetic moment 204 rotates downwardly or out of the paper, the magnetic moments 204 and 208 become more parallel which decreases the resistance. When the sense current $I_S$ 210 is conducted through the sensor changes in the resistance cause changes in the potential of the sense current circuit which are processed by the processing circuitry 50 in FIG. 3 to produce read signals.

A nonmagnetic electrically conductive spacer layer 212 is located between the free layer 202 and the pinned layer structure 206. An antiferromagnetic (AFM) pinning layer 214 interfaces and is exchange coupled to the pinned layer structure 206 for pinning the magnetic moment 208 perpendicular to the ABS. The pinning layer 214 may be located on a first read gap layer (G1) which is typically aluminum oxide ($Al_2O_3$). The preferred pin layer structure is an antiparallel (AP) pinned layer, as shown in FIG. 12. The AP pinned layer structure includes a first antiparallel (AP1) layer 218 and a second antiparallel (AP2) layer 220 that are separated by an antiparallel coupling (APC) layer 222. Exchange coupling between the pinning layer 214 and the first antiparallel pinned layer 218 causes a magnetic moment 224 of the first antiparallel pinned layer 218 to be pinned perpendicular to and away from the ABS, as shown in FIG. 12. Because of an antiparallel coupling between the layers 218 and 220 the magnetic moment 208 of the antiparallel pinned layer 220 is antiparallel to the magnetic moment 224 of the first antiparallel pinned layer 218.

In this example the pinning layer 214 was 80 Å of iridium manganese (IrMn), the first antiparallel pinned layer 218 was 30 Å of cobalt iron (CoFe), the antiparallel coupling layer 222 was 8 Å of ruthenium (Ru), the second antiparallel coupling layer 220 was 27 Å of cobalt iron (CoFe), the spacer layer 212 was 22 Å of copper (Cu) and the free layer 202 was 45 Å of nickel iron (NiFe) and 15 Å of cobalt iron (CoFe). The cap layer 226 was 50 Å of tantalum (Ta) on the free layer 202 for protecting the free layer. After resetting the spin valve sensor 200, as described hereinabove, the magnetoresistive coefficient (dr/R) was 4.5% and the ferromagnetic coupling field ($H_F$) was 9 Oe. While the iridium manganese (IrMn) pinning layer 214 promotes an improved read gap and thermal stability, the magnetoresistive coefficient (dr/R) is relatively low. When a tantalum (Ta) seed layer was employed between the iridium manganese (IrMn) pinning layer 214 and the first read gap layer 216 the magnetoresistive coefficient (dr/R) was between 3% to 5%. An objective of the present invention is to improve the magnetoresistive coefficient (dr/R).

Example 2

First Embodiment of Invention

Figure 13:
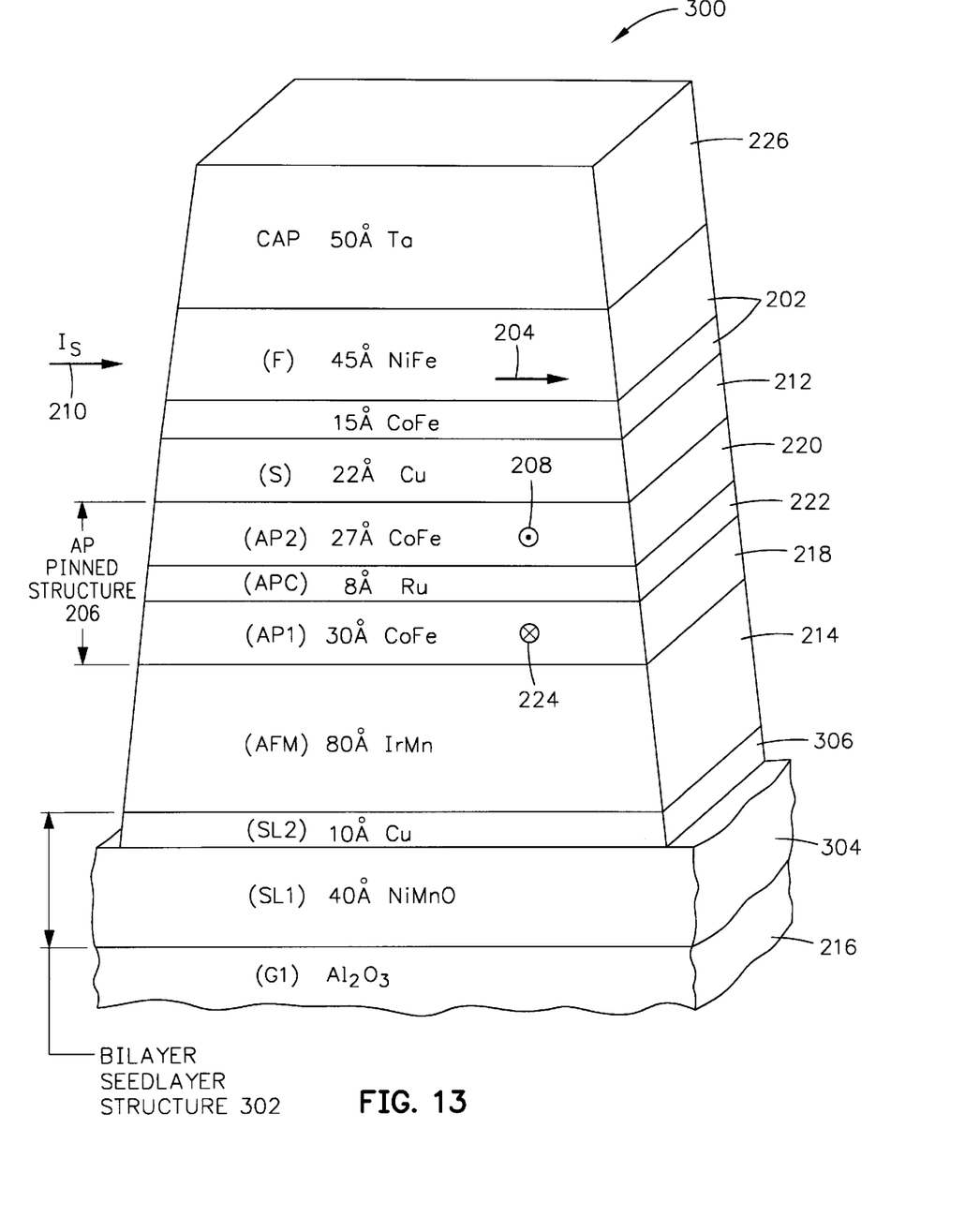
FIG. 13 is an ABS illustration of a second example which is one embodiment of the present invention wherein a bilayer seed layer is employed between the pinning layer and the first read gap layer.

The spin valve sensor 300 in FIG. 13 is a first embodiment of the present invention. The spin valve sensor 300 is the same as the spin valve sensor 200 in FIG. 12 except for a seed layer (SL) structure 302 that is located between the first read gap layer 216 and the pinning layer 214. The seed layer structure 302 has a first seed layer (SL1) 304 comprising a metallic oxide and a second seed layer (SL2) 306 comprising a nonmagnetic metal. The first seed layer 304 is located on and interfaces the first read gap layer 216 and the second seed layer 306 interfaces and is located between the first seed layer 304 and the pinning layer 214. In this example, the first seed layer 304 was 40 Å of nickel manganese oxide (NiMnO) and the second seed layer 306 was 10 Å of copper (Cu).

After resetting the pinning layer 214, as discussed hereinabove, the magnetoresistive coefficient (dr/R) of the spin valve sensor 300 was 8.24% and the ferromagnetic coupling field ($H_F$) was 6 Oe. The magnetoresistive coefficient (dr/R) of the spin valve sensor 300 in FIG. 13 is a significant improvement over the magnetoresistive coefficient (dr/R) of the spin valve sensor 200 in FIG. 12. It is believed that this improvement is due to the nickel manganese oxide (NiMnO) first seed layer 304 promoting a desirable microstructure of the iridium manganese (IrMn) pinning layer 214 and that the second copper (Cu) seed layer 316 preventing the oxygen of the nickel manganese oxide (NiMnO) first seed layer 304 from intermixing with the iridium manganese (IrMn), which intermixing would degrade its pinning properties. Accordingly, the texture of the nickel manganese oxide (NiMnO) is transplanted into the copper (Cu) which, in turn, transplants the desirable texture into the iridium manganese (IrMn). On the way, however, the copper (Cu) prevents the oxygen in the nickel manganese oxide (NiMnO) from intermixing and reacting with the iridium manganese (IrMn). In an example where nickel manganese oxide (NiMnO) was replaced with nickel oxide (NiO) the same results were obtained. In another example (not shown), ruthenium (Ru), was employed for the second seed layer 306. The result was a magnetoresistive coefficient (dr/R) between 5% to 6%. In still another example (not shown) a copper (Cu) seed layer was employed without the first nickel manganese oxide (NiMnO) seed layer 304 which gave a very low magnetoresistive coefficient (dr/R).

Example 3

Figure 14:
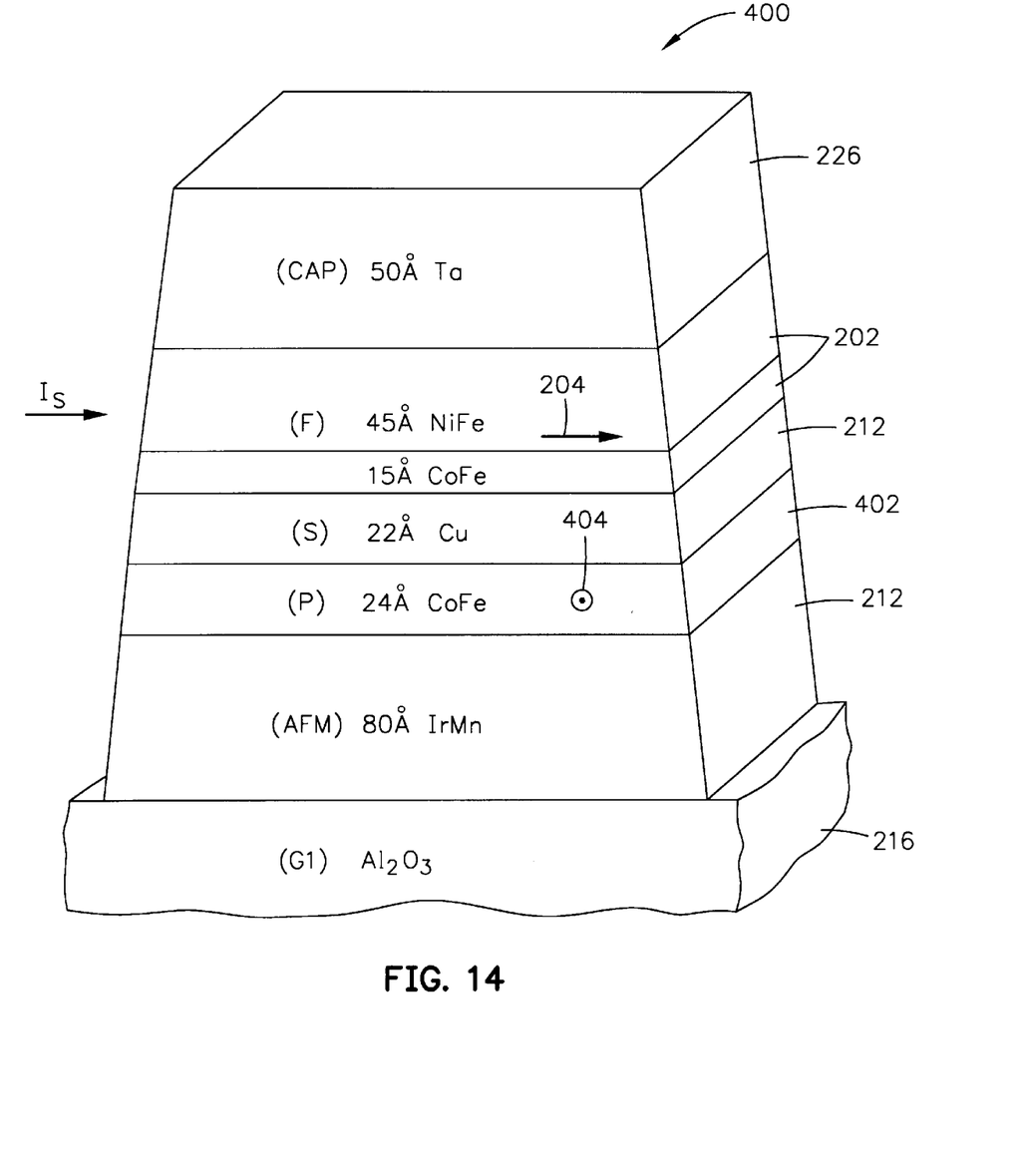
FIG. 14 is an ABS illustration of a third example investigated by me wherein a single layer pinned layer interfaces the pinning layer.

The spin valve sensor 400 shown in FIG. 14 is the same as the spin valve sensor 200 shown in FIG. 12 except the pinned layer structure is a single ferromagnetic pinned layer 402 which, in this example, was 24 Å of cobalt iron (CoFe). The magnetic moment 404 of the pinned layer 402 is shown perpendicular to and toward the ABS. It is the relative rotation between the magnetic moments 204 and 404 that determines the magnetoresistance (dr) of the read sensor 400. This example has no seed layer between the pinning layer 214 and the first read gap layer 216.

After resetting the pinning layer 214, as discussed hereinabove, the magnetoresistive coefficient (dr/R) was 4.0% and the ferromagnetic coupling field ($H_F$) was 8 Oe. It is an object of the present invention to improve this magnetoresistive coefficient (dr/R).

Example 4

Second Embodiment of Invention

Figure 15:
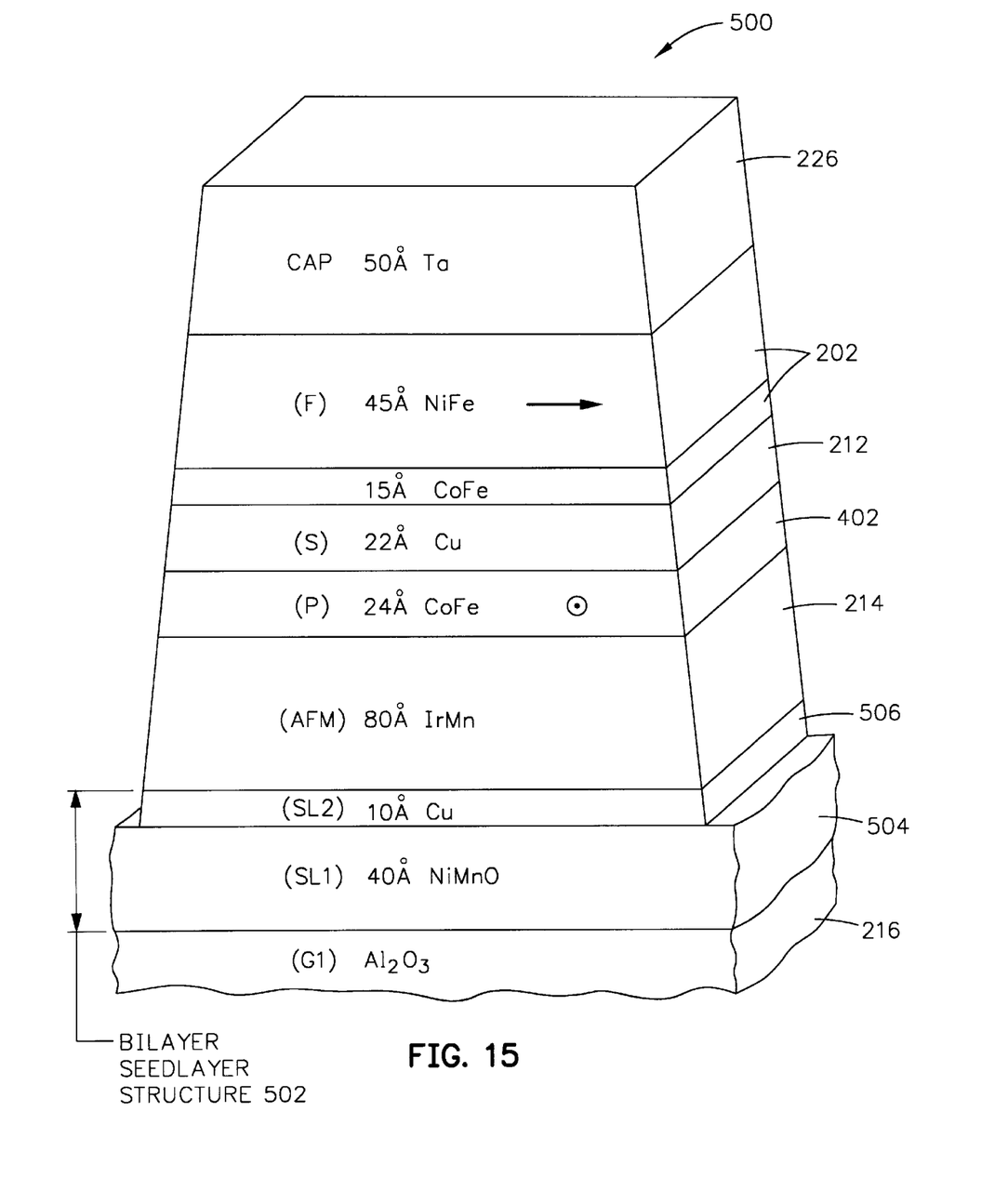
FIG. 15 is an ABS illustration of a fourth example which is a second embodiment of the present invention wherein a bilayer seed layer is employed between the pinning layer and the first read gap layer.

The spin valve sensor 500 in FIG. 15 is a second embodiment of the present invention. This spin valve sensor is the same as the spin valve sensor 400 in FIG. 14 except a seed layer structure 502 is employed between the first read gap layer 216 and the pinning layer 214. The seed layer structure 502 comprised a first seed layer (SL1) 504 of a metallic oxide and the second seed layer (SL2) 506 was a nonmagnetic metal. In this sensor the first seed layer 504 was 40 Å of nickel manganese oxide (NiMnO) and the second seed layer 506 was 10 Å of copper (Cu). The first seed layer 504 interfaced and was located on the first read gap layer 216 and the second seed layer 506 was located between and interfaced each of the first seed layer 504 and the pinning layer 214.

After resetting the spin valve sensor 500, as discussed hereinabove, the magnetoresistive coefficient (dr/R) was 5.6% and the ferromagnetic coupling field ($H_F$) was 0.1 Oe. The magnetoresistive coefficient (dr/R) of this embodiment of the invention was significantly higher than the magnetoresistive coefficient (dr/R) of the example 400 in FIG. 14.

Observations

The preferred bottom spin valve sensor is the embodiment 300 shown in FIG. 13, which is the antiparallel (AP) pinned type of spin valve sensor. The exchange coupling field between the first antiparallel layer 218 and the pinning layer 214 is substantially greater than the exchange coupling field between the single layer pinned layer 402 and the pinning layer 214 in FIG. 15. The exchange coupling field is proportional to 1/t where t is the effective thickness of the pinned layer structure. The effective magnetic thickness of the pinned layer structure 206 in FIG. 13 is the difference between the thicknesses of the first and second antiparallel pinned layers 218 and 220. This difference is 3 Å as compared to an effective magnetic thickness of 24 Å for the pinned layer 402 in FIG. 15. The pinning field ($H_P$) is equal to the exchange coupling divided by the effective magnetic thickness. Accordingly, the pinning field ($H_P$) between the pinning layer 214 and the antiparallel pinned layer 218 in FIG. 13 is the exchange coupling field divided by 3 whereas the pinning field ($H_P$) between the pinning layer 214 and the pinned layer 402 in FIG. 15 is the exchange coupling field divided by 24. Accordingly, the pinning field ($H_P$) for the spin valve sensor 300 shown in FIG. 13 is enhanced by a factor of 8 as compared to the spin valve sensor 500 shown in FIG. 15. It is important, however, that the thickness of one of the antiparallel pinned layers 218 and 220 be thicker than the other antiparallel pinned layer for resetting purposes. If the thicknesses of the antiparallel pinned layers 218 and 220 in FIG. 13 are reversed equivalent exchange coupling and pinning fields are obtained.

The nickel manganese oxide (NiMnO) of the first seed layer 304 is from a class of metallic oxides which also includes nickel oxide (NiO), iridium manganese oxide (IrMnO) and nickel iron chromium oxide (NiFeCrO). The preferred metallic oxide is nickel manganese oxide (NiMnO). The second seed layer 306 is a nonmagnetic metal from the class which includes copper (Cu), ruthenium (Ru), aluminum (Al), rhodium (Rh), palladium (Pd), platinum (Pt), gold (Au) and alloys thereof. These nonmagnetic metals are face centered cubic (FCC) structures except ruthenium (Ru) which is a hexagonal close packed (HCP) structure. The second seed layer 306 is preferably copper (Cu). The first and second seed layers 304 and 306 should be kept as thin as possible. The thickness of the copper (Cu) seed layer 306 can be modified to improve the biasing of the free layers. A preferred thickness for the first seed layer is 40 Å and a preferred thickness for the second seed layer 306 is 10 Å. However, in a broad concept of the invention the thickness of the first seed layer can range from 20 Å–500 Å and the thickness of the second seed layer may range from 5 Å–50 Å. The first read gap (G1) may consist entirely of the first seed layer or may include a layer of aluminum oxide ($Al_2O_3$). It should be understood that cobalt iron (CoFe) layers may be cobalt (Co) and that cobalt (Co) layers may be cobalt iron (CoFe).

It should be understood that the direction of the magnetic moments of the various layers in the examples, as well as the sense current $I_S$ may be reversed without departing from the spirit of the invention.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head comprising:
   a spin valve sensor including:
      a ferromagnetic free layer having a magnetic moment that is free to rotate from a first direction in response to a signal field;
      a ferromagnetic pinned layer structure having a magnetic moment;
      a nonmagnetic electrically conductive spacer layer located between the free layer and the pinned layer structure; and
      an antiferromagnetic pinning layer exchange coupled to the pinned layer structure for pinning the magnetic moment of the pinned layer structure in a second direction;
   a bilayer seed layer structure having first and second seed layers;
   the first seed layer being a metallic oxide and the second seed layer being a nonmagnetic metal; and
   the second seed layer being located between and interfacing each of the first seed layer and the pinning layer.

2. A magnetic read head as claimed in claim 1 wherein the first seed layer is nickel manganese oxide (NiMnO), the second seed layer is copper (Cu) and the pinning layer is iridium manganese (IrMn).

3. A magnetic read head as claimed in claim 1 including:
   first and second hard bias and lead layers connected to first and second side edges of the spin valve sensor;
   nonmagnetic nonconductive first and second read gap layers;
   the bilayer seed layer structure, the spin valve sensor and the first and second hard bias and lead layers being located between the first and second read gap layers;
   ferromagnetic first and second shield layers;
   the first and second read gap layers being located between the first and second shield layers.

4. A magnetic read head as claimed in claim 3 wherein the pinning layer is selected from a group comprising iridium manganese (IrMn), platinum manganese (PtMn), iron manganese (FeMn) and nickel manganese (NiMn).

5. A magnetic read head as claimed in claim 4 wherein the first seed layer is selected from a group comprising, nickel manganese oxide (NiMnO), nickel oxide (NiO), nickel iron chromium oxide (NiFeCrO) and iridium manganese oxide (IrMnO).

6. A magnetic read head as claimed in claim 5 including:
   the material of the second seed layer being selected from face centered cubic nonmagnetic metals comprising copper (Cu), aluminum (Al), rhodium (Rh), palladium (Pd), platinum (Pt), gold (Au) and their alloys.

7. A magnetic read head as claimed in claim 6 wherein the pinning layer is located between the second seed layer and the pinned layer structure.

8. A magnetic read head as claimed in claim 7 wherein the pinning layer is iridium manganese (IrMn).

9. A magnetic read head as claimed in claim 8 wherein the first seed layer is nickel manganese oxide (NiMnO).

10. A magnetic read head as claimed in claim 9 wherein the second seed layer is copper (Cu).

11. A magnetic head assembly having a read head and a write head comprising:
the write head including:
first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gaps portions; and
the read head having a spin valve sensor that includes:
a ferromagnetic free layer having a magnetic moment that is free to rotate from a first direction in response to a signal field;
a ferromagnetic pinned layer structure having a magnetic moment;
a nonmagnetic electrically conductive spacer layer located between the free layer and the pinned layer structure; and
an antiferromagnetic pinning layer exchange coupled to the pinned layer structure for pinning the magnetic moment of the pinned layer structure in a second direction;
a bilayer seed layer structure having first and second seed layers;
the first seed layer being a metallic oxide and the second seed layer being a nonmagnetic metal; and
the second seed layer being located between and interfacing each of the first seed layer and the pinning layer;
the read head further including:
first and second hard bias and lead layers connected to first and second side edges of the spin valve sensor;
nonmagnetic electrically insulative first and second read gap layers;
the bilayer seed layer structure, the spin valve sensor and the first and second hard bias and lead layers being located between the first and second read gap layers;
a ferromagnetic first shield layer; and
the first and second read gap layers being located between the first shield layer and the first pole piece layer.

12. A magnetic head assembly as claimed in claim 11 wherein the pinning layer is selected from a group comprising iridium manganese (IrMn), platinum manganese (PtMn), iron manganese (FeMn) and nickel manganese (NiMn).

13. A magnetic head assembly as claimed in claim 12 wherein the first seed layer is selected from a group comprising nickel oxide (NiO), nickel manganese oxide (NiMnO), nickel iron chromium oxide (NiFeCrO) and iridium manganese oxide (IrMnO).

14. A magnetic head assembly as claimed in claim 13 including:
the material of the second seed layer being selected from face centered cubic nonmagnetic metals comprising copper (Cu), aluminum (Al), rhodium (Rh), palladium (Pd), platinum (Pt), gold (Au) and their alloys.

15. A magnetic head assembly as claimed in claim 14 including:
the read head further including:
a ferromagnetic second shield layer;
a nonmagnetic separation layer; and
the separation layer being located between the second shield layer the first pole piece layer.

16. A magnetic head assembly as claimed in claim 14 wherein the pinning layer is located between the second seed layer and the pinned layer structure.

17. A magnetic head assembly as claimed in claim 16 wherein the pinning layer is iridium manganese (IrMn).

18. A magnetic head assembly as claimed in claim 17 wherein the first seed layer is nickel manganese oxide (NiMnO).

19. A magnetic head assembly as claimed in claim 18 wherein the second seed layer is copper (Cu).

20. A magnetic disk drive having at least one slider that has an air bearing surface (ABS), the slider supporting at least one magnetic head assembly that includes a read head and a write head, the disk drive comprising:
the write head including:
first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head having a spin valve sensor that includes:
a ferromagnetic free layer having a magnetic moment that is free to rotate from a first direction in response to a signal field;
a ferromagnetic pinned layer structure having a magnetic moment;
a nonmagnetic electrically conductive spacer layer located between the free layer and the pinned layer structure; and
an antiferromagnetic pinning layer exchange coupled to the pinned layer structure for pinning the magnetic moment of the pinned layer structure in a second direction;
a bilayer seed layer structure having first and second seed layers;
the first seed layer being a metallic oxide and the second seed layer being a nonmagnetic metal; and
the second seed layer being located between and interfacing each of the first seed layer and the pinning layer;
the read head further including:
first and second hard bias and lead layers connected to first and second side edges of the spin valve sensor;
nonmagnetic electrically insulative first and second read gap layers;
the bilayer seed layer structure, the spin valve sensor and the first and second hard bias and lead layers being located between the first and second read gap layers;
a ferromagnetic first shield layer; and
the first and second read gap layers being located between the first shield layer and the first pole piece layer; and a housing;

a magnetic disk rotatably supported in the housing;

a support mounted in the housing for supporting the magnetic head assembly with the ABS facing the magnetic disk so that the magnetic head assembly is in a transducing relationship with the magnetic disk;

means for rotating the magnetic disk;

positioning means connected to the support for moving the magnetic head assembly to multiple positions with respect to said magnetic disk; and processing means connected to the magnetic head assembly, to the means for rotating the magnetic disk and to the positioning means for exchanging signals with the magnetic head assembly, for controlling rotation of the magnetic disk and for controlling the position of the magnetic head assembly.

21. A magnetic disk drive as claimed in claim 20 wherein the pinning layer is selected from a group comprising iridium manganese (IrMn), platinum manganese (PtMn), iron manganese (FeMn) and nickel manganese (NiMn).

22. A magnetic disk drive as claimed in claim 21 wherein the first seed layer is selected from a group comprising nickel manganese oxide (NiMnO) nickel oxide (NiO), nickel iron chromium oxide (NiFeCrO) and iridium manganese oxide (IrMnO).

23. A magnetic disk drive as claimed in claim 22 including:

the material of the second seed layer being selected from face centered cubic nonmagnetic metals comprising copper (Cu), aluminum (Al), rhodium (Rh), palladium (Pd), platinum (Pt), gold (Au) and their alloys.

24. A magnetic disk drive as claimed in claim 23 including:

the read head further including:
a ferromagnetic second shield layer;
a nonmagnetic separation layer; and
the separation layer being located between the second shield layer the first pole piece layer.

25. A magnetic disk drive as claimed in claim 23 wherein the pinning layer is located between the second seed layer and the pinned layer structure.

26. A magnetic disk drive as claimed in claim 25 wherein the pinning layer is iridium manganese (IrMn).

27. A magnetic disk drive as claimed in claim 26 wherein the first seed layer is nickel manganese oxide (NiMnO).

28. A magnetic disk drive as claimed in claim 27 wherein the second seed layer is copper (Cu).

29. A method of making a magnetic read head that includes a spin valve sensor comprising the steps of:

forming a metallic oxide first seed layer;:

forming a nonmagnetic metallic second seed layer on the first seed layer; and forming an antiferromagnetic pinning layer of said spin valve sensor on the second seed layer with the second seed layer being located between and interfacing each of the first seed layer and the pinning layer.

30. A method as claimed in claim 29 wherein the pinning layer is formed from one of a group comprising iridium manganese (IrMn), platinum manganese (PtMn), iron manganese (FeMn) and nickel manganese (NiMn).

31. A method as claimed in claim 30 wherein the first seed layer is formed from one of a group comprising nickel manganese oxide (NiMnO), nickel oxide (NiO), nickel iron chromium oxide (NiFeCrO) and iridium manganese oxide (IrMnO).

32. A method as claimed in claim 31 wherein the material of the second seed layer is formed from face centered cubic nonmagnetic metals comprising copper (Cu), aluminum (Al), rhodium (Rh), palladium (Pd), platinum (Pt), gold (Au) and their alloys.

33. A method as claimed in claim 32 wherein the pinning layer is formed between the second seed layer and the pinned layer structure.

34. A method as claimed in claim 33 wherein the pinning layer is formed of iridium manganese (IrMn).

35. A method as claimed in claim 34 wherein the first seed layer is formed of nickel manganese oxide (NiMnO).

36. A method as claimed in claim 35 wherein the second seed layer is formed of copper (Cu).

37. A method of making a magnetic head assembly having a read head and a write head, wherein the read head includes a spin valve sensor, comprising:

making the read head as follows:
forming a ferromagnetic first shield layer;
forming a nonmagnetic electrically insulative first read gap layer on the first shield layer;
forming a metallic oxide first seed layer on the first read gap layer;
forming a nonmagnetic metallic second seed layer on the first seed layer; and
forming an antiferromagnetic pinning layer of said spin valve sensor on the second seed layer with the second seed layer located between and interfacing each of the first seed layer and the pinning layer;
connecting first and second hard bias and lead layers to first and second side edges of the spin valve sensor;
forming a nonmagnetic electrically insulative second read gap layer on the spin valve sensor and the first and second hard bias and lead layers;
forming the write head as follows:
forming a ferromagnetic first pole piece layer on the second read gap layer that has a yoke region located between a pole tip region and a back gap region;
forming an insulation stack with at least one coil layer embedded therein on the first pole piece layer in the yoke region;
forming a nonmagnetic electrically insulative write gap layer on the first pole piece layer in the pole tip region; and
forming a ferromagnetic second pole piece layer on the write gap layer, the insulation stack and connected to the first pole piece layer in the back gap region.

38. A method as claimed in claim 35 wherein the pinning layer is formed from one of a group comprising iridium manganese (IrMn), platinum manganese (PtMn) iron manganese (FeMn) and nickel manganese (NiMn).

39. A method as claimed in claim 38 wherein the first seed layer is formed from one of a group comprising nickel manganese oxide (NiMnO), nickel oxide (NiO), nickel iron chromium (NiFeCrO) and iridium manganese oxide (IrMnO).

40. A method as claimed in claim 39 wherein the material of the second seed layer is formed from face centered cubic nonmagnetic metals comprising copper (Cu), aluminum (Al), rhodium (Rh), palladium (Pd), platinum (Pt), gold (Au) and their alloys.

41. A method as claimed in claim 40 including:

the making of the read head further including:

forming a ferromagnetic second shield layer on the second read gap layer; and forming a nonmagnetic separation layer on the second shield layer so that the separation layer is located between the second shield layer the first pole piece layer.

42. A method as claimed in claim 40 wherein the pinning layer is formed between the second seed layer and a pinned layer structure of said spin valve sensor.

43. A method as claimed in claim 42 wherein the pinning layer is formed of iridium manganese (IrMn).

44. A method as claimed in claim 43 wherein the first seed layer is formed of nickel manganese oxide (NiMnO).

45. A method as claimed in claim 44 wherein the second seed layer is formed of copper (Cu).

* * * * *